United States Patent
Yanase et al.

(10) Patent No.: US 8,905,819 B2
(45) Date of Patent: Dec. 9, 2014

(54) INTERNAL GEAR MACHINING METHOD

(75) Inventors: Yoshikoto Yanase, Ritto (JP); Masashi Ochi, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 532 days.

(21) Appl. No.: 13/142,871

(22) PCT Filed: Nov. 13, 2009

(86) PCT No.: PCT/JP2009/069335
§ 371 (c)(1),
(2), (4) Date: Jul. 13, 2011

(87) PCT Pub. No.: WO2010/079651
PCT Pub. Date: Jul. 15, 2010

(65) Prior Publication Data
US 2011/0275287 A1 Nov. 10, 2011

(30) Foreign Application Priority Data
Jan. 9, 2009 (JP) .................................. 2009-003146

(51) Int. Cl.
*B24B 1/00* (2006.01)
*B23F 5/04* (2006.01)

(52) U.S. Cl.
CPC ....................... *B23F 5/04* (2013.01)
USPC .................................. 451/47; 451/51; 451/61

(58) Field of Classification Search
USPC ............. 409/65, 66; 451/47, 51, 61, 114, 147
See application file for complete search history.

(56) References Cited

U.S. PATENT DOCUMENTS

| | | | | |
|---|---|---|---|---|
| 2,615,359 A | * | 10/1952 | Cook et al. .......................... | 82/19 |
| 4,174,914 A | * | 11/1979 | Ainoura ........................... | 407/26 |
| 4,630,404 A | * | 12/1986 | Erhardt et al. ................. | 451/253 |
| 5,413,520 A | * | 5/1995 | Feisel ................................ | 451/1 |
| 2010/0210198 A1 | | 8/2010 | Yanase et al. | |

FOREIGN PATENT DOCUMENTS

| | | |
|---|---|---|
| CN | 201086106 Y | 7/2008 |
| DE | 1124786 B | 3/1962 |
| FR | 2070927 | 9/1971 |
| JP | 60-39022 A | 2/1985 |

(Continued)

OTHER PUBLICATIONS

Hoyashita, "Barrel Worm-Shaped Tool with Conjugate Cutting-Edge Profile Generated from Tooth Profile of Internal Gear", Transactions of the Japan Society of Mechanical Engineers C, Jan. 1996, vol. 62, No. 593, pp. 284-290.

*Primary Examiner* — Timothy V Eley
(74) *Attorney, Agent, or Firm* — Birch, Stewart, Kolasch & Birch, LLP (57) ABSTRACT

Provided is an internal gear machining method capable of achieving improvement of machining accuracy and extension of the tool life by increasing a slip velocity. For this purpose, internal gear machining is performed on a workpiece (W) by synchronously rotating the workpiece (W) and a barrel-shaped threaded grinding wheel (11) in mesh with each other. The workpiece (W) is rotatable about a workpiece rotation axis (C1), and the barrel-shaped threaded grinding wheel (11) is rotatable about a grinding wheel rotation axis (B1) having a predetermined shaft angle ($\Sigma$) to the workpiece rotation axis (C1). In the internal gear machining method, the shaft angle ($\Sigma$) is set large based on the amount of change in a grinding pitch wheel pitch radius of the threaded grinding wheel (11).

2 Claims, 5 Drawing Sheets

(56) References Cited

FOREIGN PATENT DOCUMENTS

| JP | 60-194423 U | 12/1985 |
| JP | 2004-136426 A | 5/2004 |
| JP | 2009-142939 A | 7/2009 |
| TW | 320679 | 11/1997 |
| WO | WO 2009/078193 A1 | 6/2009 |

* cited by examiner

| | 1 | 2 | 3 | 4 | 5 | 6 | 7 |
|---|---|---|---|---|---|---|---|
| GRINDING WHEEL WIDTH (mm) | 30 | 30 | 30 | 30 | 30 | 30 | 30 |
| GRINDING WHEEL REFERENCE HELIX ANGLE (deg) | 30 | 35 | 40 | 45 | 50 | 55 | 60 |
| SHAFT ANGLE (deg) | 10 | 15 | 20 | 25 | 30 | 35 | 40 |
| GRINDING WHEEL REFERENCE PITCH DIAMETER (mm) | 53.1 | 56.2 | 60.0 | 65.1 | 71.6 | 80.2 | 92.0 |
| AMOUNT OF CHANGE IN GRINDING WHEEL PITCH RADIUS (mm) | 0.09 | 0.20 | 0.35 | 0.54 | 0.76 | 1.00 | 1.26 |

| | 1 | 2 | 3 | 4 | 5 | 6 | 7 |
|---|---|---|---|---|---|---|---|
| GRINDING WHEEL WIDTH (mm) | 30 | 30 | 30 | 30 | 30 | 30 | 30 |
| GRINDING WHEEL REFERENCE HELIX ANGLE (deg) | 25 | 30 | 35 | 40 | 45 | 50 | 55 |
| SHAFT ANGLE (deg) | 10 | 15 | 20 | 25 | 30 | 35 | 40 |
| GRINDING WHEEL REFERENCE PITCH DIAMETER (mm) | 64.0 | 67.0 | 70.8 | 75.7 | 82.0 | 90.2 | 101.1 |
| AMOUNT OF CHANGE IN GRINDING WHEEL PITCH RADIUS (mm) | 0.07 | 0.15 | 0.25 | 0.39 | 0.54 | 0.70 | 0.87 |

| | 1 | 2 | 3 | 4 | 5 | 6 | 7 |
|---|---|---|---|---|---|---|---|
| GRINDING WHEEL WIDTH (mm) | 30 | 30 | 30 | 30 | 30 | 30 | 30 |
| GRINDING WHEEL REFERENCE HELIX ANGLE (deg) | 30 | 35 | 40 | 45 | 50 | 55 | 60 |
| SHAFT ANGLE (deg) | 10 | 15 | 20 | 25 | 30 | 35 | 40 |
| GRINDING WHEEL REFERENCE PITCH DIAMETER (mm) | 43.0 | 45.4 | 48.6 | 52.6 | 57.9 | 64.9 | 74.4 |
| AMOUNT OF CHANGE IN GRINDING WHEEL PITCH RADIUS (mm) | 0.09 | 0.21 | 0.36 | 0.56 | 0.78 | 1.03 | 1.31 |

FIG.5(b)

INTERNAL GEAR MACHINING METHOD

TECHNICAL FIELD

The present invention relates to an internal gear machining method which performs gear machining on a to-be-machined internal gear using a barrel-shaped threaded tool.

BACKGROUND ART

In general, a gear machining process includes: forming a gear by machining a predetermined material of the gear by gear cutting; heat-treating the machined gear; and then finishing (grinding) the gear to remove distortion and the like due to this heat treatment. Heretofore, various tooth grinding methods using tools such as WA grinding wheels and superabrasive (diamond, CBN, and the like) grinding wheels have been provided to efficiently finish the faces of the teeth of a heat-treated gear. Moreover, tools for use in these methods are in external gear form, internal gear form, screw (worm) form, and the like which are chosen in accordance with the form of a gear to be ground.

On the other hand, gears are frequently used in automotive transmissions and the like. Recently, there has been a demand for the improvement of machining accuracy for the purpose of reducing the vibration and noise of such transmissions.

Accordingly, heretofore, an external gear grinding method has been provided which performs tooth face grinding by synchronously rotating a heat-treated external gear and a grinding wheel gear in mesh with each other with a crossed axes angle therebetween. By such a method, a slip velocity between the external gear and the grinding wheel gear is produced using the mesh rotation and the crossed axes angle, and thereby the faces of the teeth of the external gear can be finely ground. Such a conventional external gear grinding method is disclosed in, for example, Patent Document 1.

PRIOR ART DOCUMENT

Patent Document

Patent Document 1: Japanese Patent Application Publication No. 2004-136426

SUMMARY OF THE INVENTION

Problem to be Solved by the Invention

In contrast, in the case of grinding an internal gear among gears, a threaded grinding wheel is meshed with the internal gear on the inside of the internal gear. Hence, the external diameter of the threaded grinding wheel must be set smaller than the internal diameter of the internal gear. However, forming the threaded grinding wheel with a smaller diameter as described above inevitably reduces the surface area thereof effective for grinding, resulting in a shorter tool life.

Accordingly, the present invention has been made to solve the above-described problem, and an object of the present invention is to provide an internal gear machining method capable of achieving improvement of machining accuracy and extension of the tool life by increasing a slip velocity.

Means for Solving the Problem

An internal gear machining method according to a first invention to solve the above problem is an internal gear machining method which performs internal gear machining on a to-be-machined internal gear by synchronously rotating the to-be-machined internal gear and a barrel-shaped threaded tool in mesh with each other, the to-be-machined internal gear being rotatable about a workpiece rotation axis, the barrel-shaped threaded tool being rotatable about a tool rotation axis having a predetermined crossed axes angle to the workpiece rotation axis, wherein the crossed axes angle is set based on the threaded tool form.

In an internal gear machining method according to a second invention to solve the above problem, the threaded tool has such a form that an amount of change in a tool radius and the crossed axes angle satisfy a relationship that the crossed axes angle increases as the amount of change in a tool radius increases, where the amount of change in a tool radius is found from a tool diameter of an axially intermediate portion of the threaded tool and tool diameters of axially opposite end portions thereof.

In an internal gear machining method according to a third invention to solve the above problem, the threaded tool is formed into a barrel shape having a tool diameter gradually decreasing from an axially intermediate portion of the threaded tool toward axially opposite end portions thereof.

Effects of the Invention

With an internal gear machining method according to the present invention, a slip velocity can be increased by setting a crossed axes angle large based on the form of a threaded tool. This improves the cutting quality of the threaded tool, whereby the improvement of machining accuracy and the extension of the tool life can be achieved.

BRIEF DESCRIPTION OF THE DRAWINGS

FIG. 3 shows a result of an analysis by simulation (1). Part (a) thereof is a table showing the shaft angle and the amount of change in the grinding wheel pitch radius in relation to grinding wheel specifications, and Part (b) thereof is a view showing the relationship between the shaft angle and the amount of change in the grinding wheel pitch radius.

FIG. 4 shows a result of an analysis by simulation (2). Part (a) thereof is a table showing the shaft angle and the amount of change in the grinding wheel pitch radius in relation to grinding wheel specifications, and Part (b) thereof is a view showing the relationship between the shaft angle and the amount of change in the grinding wheel pitch radius.

FIG. 5 shows a result of an analysis by simulation (3). Part (a) thereof is a table showing the shaft angle and the amount of change in the grinding wheel pitch radius in relation to grinding wheel specifications, and Part (b) thereof is a view showing the relationship between the shaft angle and the amount of change in the grinding wheel pitch radius.

MODE FOR CARRYING OUT THE INVENTION

Hereinafter, an internal gear machining method according to the present invention will be described in detail with reference to the drawings. It should be noted that in this embodiment described below, the internal gear machining method according to the present invention is applied to an internal gear grinding method using a gear grinding machine.

EMBODIMENT

Figure 1:
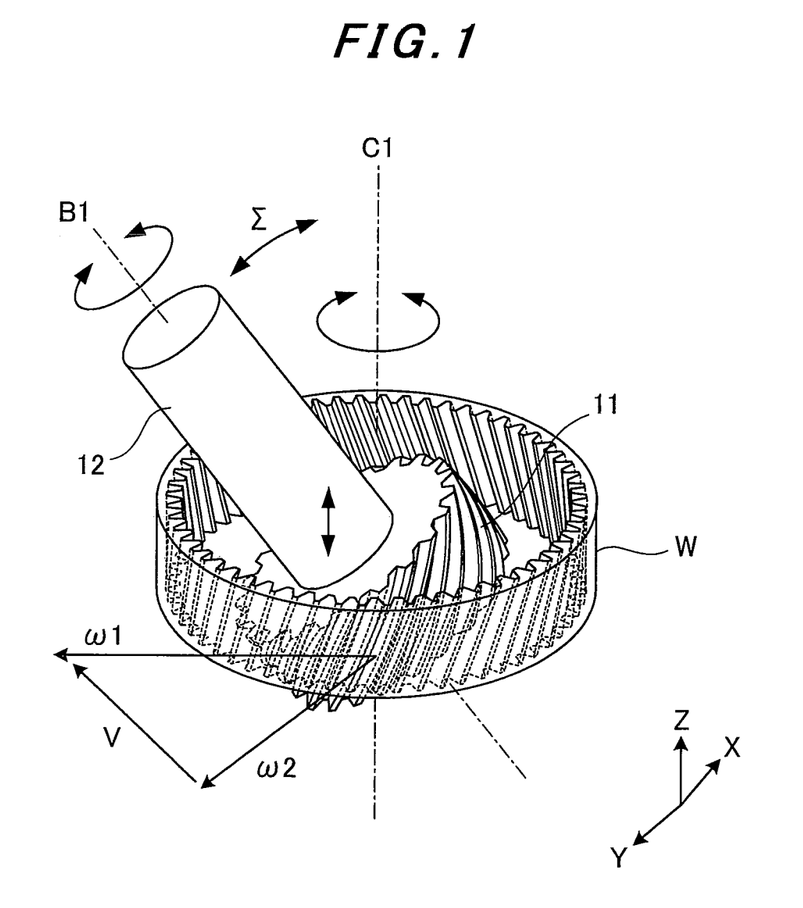
FIG. 1 is a view showing an internal gear grinding method according to one embodiment of the present invention.

As shown in FIG. 1, a gear grinding machine (not shown) employing an internal gear machining method according to the present invention is intended to grind a workpiece (to-be-machined internal gear) W using a threaded grinding wheel (threaded tool) 11. It should be noted that the gear grinding machine is also capable of grinding a to-be-machined external gear which is not shown.

The workpiece W is attached to the gear grinding machine to be rotatable about a vertical (direction of the Z axis) workpiece rotation axis C1. This workpiece W is given workpiece (internal gear) specifications from which a predetermined tooth profile can be obtained.

Moreover, on the gear grinding machine, a grinding wheel arbor 12 is supported to be rotatable about a grinding wheel rotation axis B1 and movable in a direction to adjust the distance between the workpiece rotation axis C1 and the grinding wheel rotation axis B1 (hereinafter, referred to as the direction of the X axis), in a direction perpendicular to the grinding wheel rotation axis B1 (hereinafter, referred to as the direction of the Y axis), and in the direction of the Z axis. Further, the threaded grinding wheel 11 for grinding the workpiece W is attached to the tip of this grinding wheel arbor 12. Accordingly, moving the grinding wheel arbor 12 in the directions of the X, Y, and Z axes and rotating the grinding wheel arbor 12 about the grinding wheel rotation axis B1 cause the threaded grinding wheel 11 to move and rotate with the grinding wheel arbor 12.

Further, the grinding wheel arbor 12 is supported to be turnable about an unillustrated grinding wheel pivot extending in the direction of the X axis. Accordingly, a crossed axes angle (hereinafter referred to as a shaft angle Σ) between this grinding wheel rotation axis B1 and the workpiece rotation axis C1 can be adjusted by turning the grinding wheel arbor 12 about the grinding wheel pivot to change a turning angle of the grinding wheel rotation axis B1. In other words, in grinding, the threaded grinding wheel 11 rotates about the grinding wheel rotation axis B1 intersecting the workpiece rotation axis C1 of the workpiece W at the shaft angle Σ.

It should be noted that grinding the to-be-machined external gear with the above-described gear grinding machine is made possible by attaching, in place of the threaded grinding wheel 11, a grinding wheel gear to the tip of the grinding wheel arbor 12.

Figure 2:
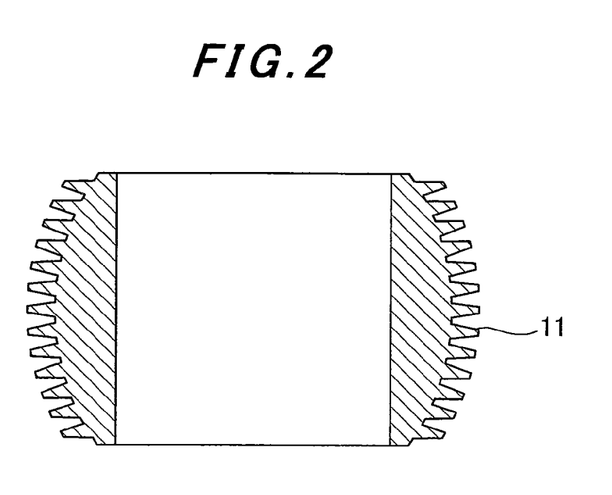
FIG. 2 is a vertical cross-sectional view of a threaded grinding wheel.

Further, as shown in FIG. 2, the threaded grinding wheel 11 is formed into a barrel shape which has a diameter dimension gradually decreasing from the axially intermediate portion thereof toward the axially opposite end portions thereof. Forming the threaded grinding wheel 11 into such a barrel shape enables this threaded grinding wheel 11 to be meshed with the workpiece W even if the threaded grinding wheel 11 is placed to be tilted at the shaft angle Σ. Further, the threaded grinding wheel 11 is given grinding wheel specifications which appropriately mesh with the workpiece specifications. Note that the shaft angle Σ is found from a workpiece helix angle and a grinding wheel helix angle of the axially intermediate portion (hereinafter, referred to as a grinding wheel reference helix angle) as [(the grinding wheel reference helix angle)−(the workpiece helix angle)].

Accordingly, as shown in FIG. 1, the grinding of the workpiece W with the threaded grinding wheel 11 starts with turning the grinding wheel arbor 12 to place the threaded grinding wheel 11 at the predetermined shaft angle Σ. Subsequently, the threaded grinding wheel 11 placed at the shaft angle Σ is moved to the inside of the workpiece W, and then further moved to be meshed with the workpiece W. Further, in the above-described meshing condition, the workpiece W is rotated about the workpiece rotation axis C1, and the threaded grinding wheel 11 is moved up and down (in a direction of the Z axis) while being rotated about the grinding wheel rotation axis B1. Thus, the faces of the teeth of the workpiece W are ground by the faces of the threads of the threaded grinding wheel 11.

Moreover, in the above-described grinding, since the threaded grinding wheel 11 rotates about the grinding wheel rotation axis B1 intersecting the workpiece rotation axis C1 at the shaft angle Σ, a slip velocity V occurs between the threaded grinding wheel 11 and the workpiece W. This slip velocity V is a relative velocity of a workpiece angular velocity ω1 of the workpiece W with respect to a grinding wheel angular velocity ω2 of the threaded grinding wheel 11 at a contact point between a thread face of the threaded grinding wheel 11 and a tooth face of the workpiece W (the slip velocity V may also be a relative velocity of the grinding wheel angular velocity ω2 of the threaded grinding wheel 11 with respect to the workpiece angular velocity ω1 of the workpiece W). The faces of the teeth of the workpiece W are finely ground by a mesh rotation and the shaft angle Σ producing the slip velocity V between the threaded grinding wheel 11 and the workpiece W as described above.

As described above, the slip velocity V is a relative velocity of the workpiece angular velocity ω1 of the workpiece W with respect to the grinding wheel angular velocity ω2, whereby the slip velocity V can be set based on the shaft angle Σ. Specifically, by setting a diameter dimension of the threaded grinding wheel 11 to gradually decrease from the axially intermediate portion thereof toward the axially opposite end portions thereof, the shaft angle Σ can be made large, and thus the slip velocity V can be made large. However, setting the shaft angle Σ too large may cause the grinding wheel arbor 12 to interfere with the workpiece W.

To address this, in the internal gear grinding method according to the present invention, the form of the threaded grinding wheel 11 is also taken into account in addition to merely setting the shaft angle Σ large in order to increase the slip velocity V.

Next, a method of setting the shaft angle Σ based on the form of the threaded grinding wheel 11 in order to increase the slip velocity V will be described with reference to FIGS. 3 to 5.

To clarify the relationship between the shaft angle and the form of the threaded grinding wheel 11, analyses were performed by simulations (1) to (3) below. It should be noted that in each of these simulations (1) to (3), an analysis was performed using the threaded grinding wheel 11 in which the grinding wheel width was constant, with workpiece specifications and grinding wheel specifications changed.

First, simulation (1) will be described with reference to Parts (a) and (b) of FIG. 3.

In this simulation (1), workpiece specifications and grinding wheel specifications were set as shown in the following (W1) and (T1).

(W1)
Workpiece Specifications
Module: 2.0
Number of Teeth: 60
Pressure Angle: 20°
Helix Angle: 20°
Dedendum Diameter: 131.7 mm
Addendum Diameter: 123.7 mm
Face Width: 30 mm
(T1)
Grinding Wheel Specifications
Number of Threads: 23
Grinding Wheel Width: 30 mm
Grinding Wheel Reference Helix Angle: 30° to 60°

When the number of teeth, the grinding wheel width, and the grinding wheel reference helix angle are set for the threaded grinding wheel 11 as described above, the shaft angle $\Sigma$, the grinding wheel pitch diameter of the axially intermediate portion (hereinafter, referred to as a grinding wheel reference pitch diameter), the grinding wheel pitch diameters of the axially opposite end portions, and the like are set accordingly. Thus, the amount of change in the grinding wheel pitch radius can be found. This amount of change in the grinding wheel pitch radius is the amount of change (amount of decrease) in the grinding wheel pitch radii of the axially opposite end portions with respect to the grinding wheel pitch radius of the axially intermediate portion (hereinafter, referred to as a grinding wheel reference pitch radius), and is found as [(the grinding wheel reference pitch radius)−(the grinding wheel pitch radii of the axially opposite end portions)].

A simulation was performed on each of the threaded grinding wheels 11 having the above-described grinding wheel specifications. This simulation showed that the slip velocity V was as high as a satisfactory level. To examine several threaded grinding wheels 11 of these, part of the grinding wheel specifications thereof, together with the corresponding shaft angles $\Sigma$ and the corresponding amounts of change in the grinding wheel pitch radius, were collected in a table as shown in Part (a) of FIG. 3, and the relationship between the shaft angle $\Sigma$ and the amount of change in the grinding wheel pitch radius was revealed as shown in Part (b) of FIG. 3.

Figure 3A:
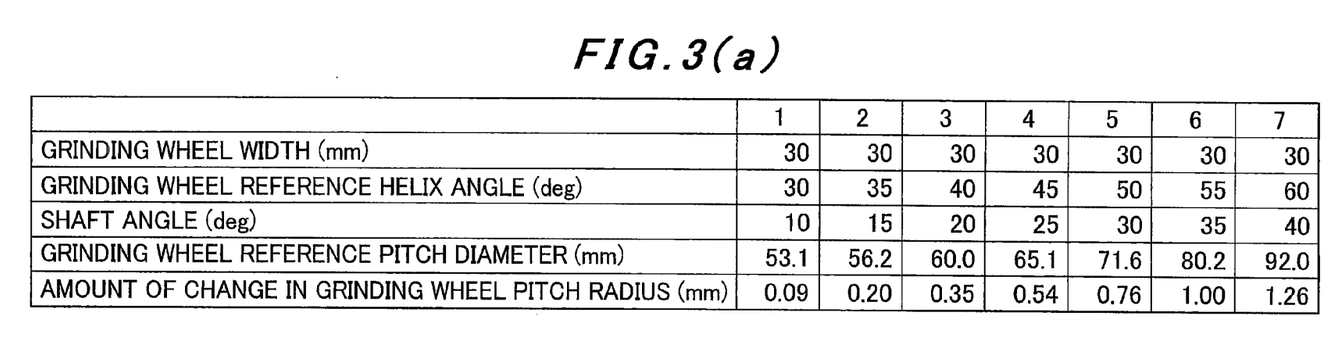
Figure 3B:
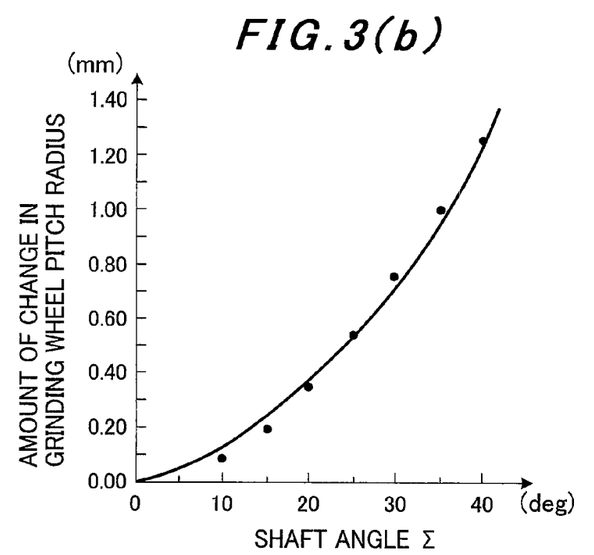

Accordingly, as shown in Part (a) of FIG. 3, it can be seen that the grinding wheel reference pitch diameter and the amount of change in the grinding wheel pitch radius increase as the shaft angle $\Sigma$ increases. In other words, as the amount of change in the grinding wheel pitch radius increases, the grinding wheel reference pitch diameter increases, while the grinding wheel pitch diameters of the axially opposite end portions decrease. Thus, the diameters of the threaded grinding wheel 11 at the ends thereof decrease, whereby the shaft angle $\Sigma$ increases. Moreover, as shown in Part (b) of FIG. 3, it can be seen that the amount of change in the grinding wheel pitch radius does not increase at a constant rate as the shaft angle $\Sigma$ increases but the increment thereof gradually increases.

Note that the shaft angle $\Sigma$ is set in the range between 10° and 40°. This is because the slip velocity V is too low when the shaft angle $\Sigma$ is less than 10° and the grinding wheel arbor 12 may interfere with the workpiece W when the shaft angle $\Sigma$ is more than 40°.

Next, simulation (2) will be described with reference to Parts (a) and (b) of FIG. 4.

In this simulation (2), workpiece specifications and grinding wheel specifications were set as shown in the following (W2) and (T2).
(W2)
Workpiece Specifications
Module: 2.0
Number of Teeth: 80
Pressure Angle: 20°
Helix Angle: 15°
Dedendum Diameter: 169.6 mm
Addendum Diameter: 161.6 mm
Face Width: 30 mm
(T2)
Grinding Wheel Specifications
Number of Threads: 29
Grinding Wheel Width: 30 mm
Grinding Wheel Reference Helix Angle: 25° to 55°

Figure 4A:
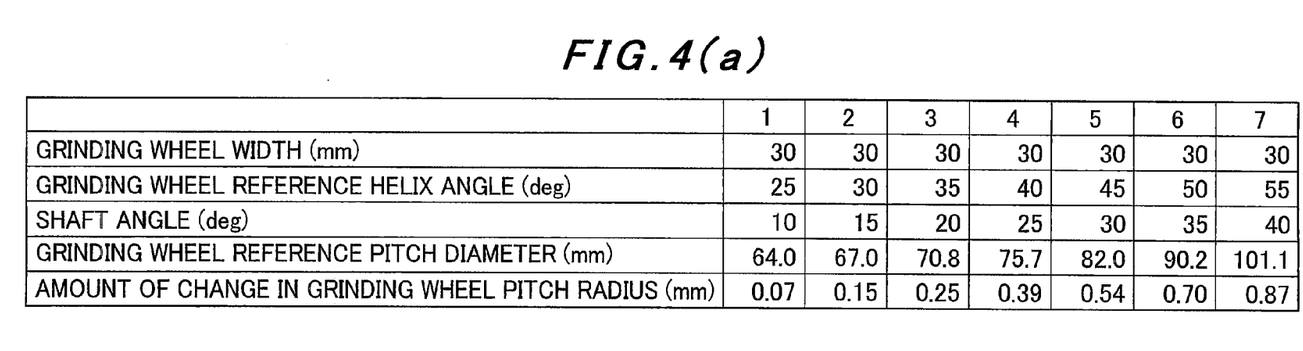
Figure 4B:
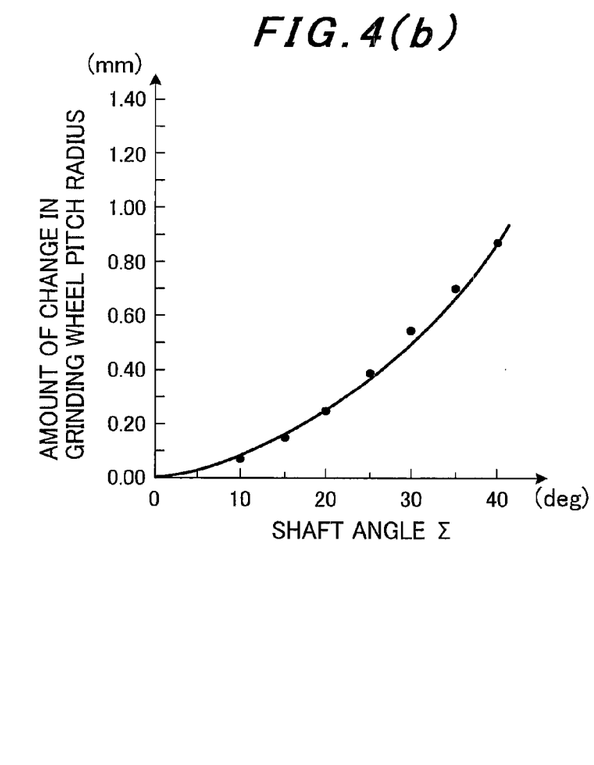

Accordingly, as shown in Part (a) of FIG. 4, it can be seen that the grinding wheel reference pitch diameter and the amount of change in the grinding wheel pitch radius increase as the shaft angle $\Sigma$ increases. In other words, as the amount of change in the grinding wheel pitch radius increases, the grinding wheel reference pitch diameter increases, while the grinding wheel pitch diameters of the axially opposite end portions decrease. Thus, the diameters of the threaded grinding wheel 11 at the ends thereof decrease, whereby the shaft angle $\Sigma$ increases. Moreover, as shown in Part (b) of FIG. 4, it can be seen that the amount of change in the grinding wheel pitch radius does not increase at a constant rate as the shaft angle $\Sigma$ increases but the increment thereof gradually increases.

Next, simulation (3) will be described with reference to Parts (a) and (b) of FIG. 5.

In this simulation (3), workpiece specifications and grinding wheel specifications were set as shown in the following (W3) and (T3).
(W3)
Workpiece Specifications
Module: 1.2
Number of Teeth: 90
Pressure Angle: 20°
Helix Angle: 20°
Dedendum Diameter: 117.3 mm
Addendum Diameter: 112.5 mm
Face Width: 30 mm
(T3)
Grinding Wheel Specifications
Number of Threads: 31
Grinding Wheel Width: 30 mm
Grinding Wheel Reference Helix Angle: 30° to 60°

Figure 5A:
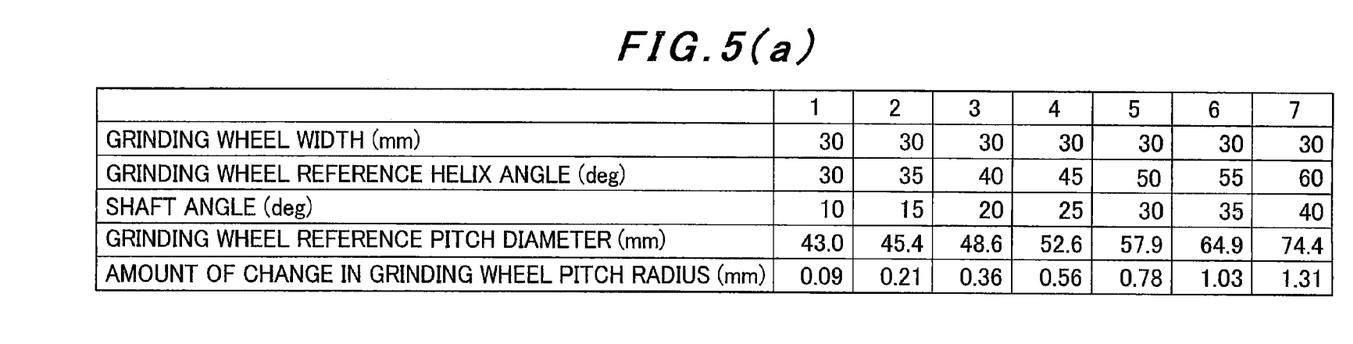
Figure 5B:
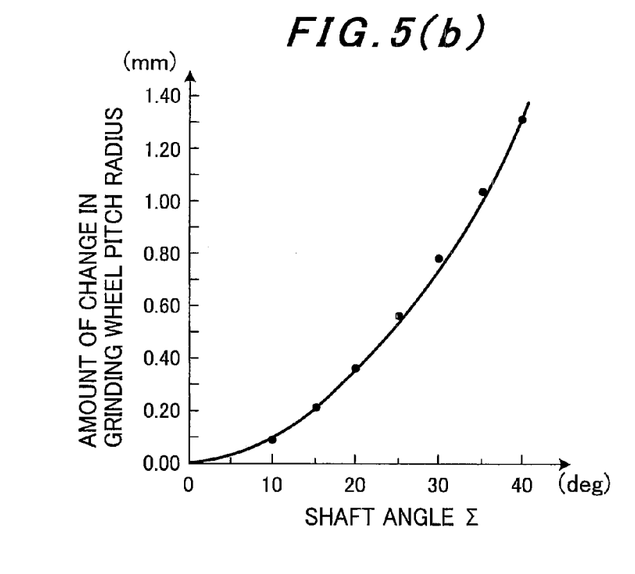

Accordingly, as shown in Part (a) of FIG. 5, it can be seen that the grinding wheel reference pitch diameter and the amount of change in the grinding wheel pitch radius increase as the shaft angle $\Sigma$ increases. In other words, as the amount of change in the grinding wheel pitch radius increases, the grinding wheel reference pitch diameter increases, while the grinding wheel pitch diameters of the axially opposite end portions decrease. Thus, the diameters of the threaded grinding wheel 11 at the ends thereof decrease, whereby the shaft angle $\Sigma$ increases. Moreover, as shown in Part of FIG. 5, it can be seen that the amount of change in the grinding wheel pitch radius does not increase at a constant rate as the shaft angle $\Sigma$ increases but the increment thereof gradually increases.

Specifically, as can be seen from FIGS. 3 to 5, the shaft angle $\Sigma$ can be set large by using the threaded grinding wheel 11 having a large amount of change in the grinding wheel pitch radius. Thus, the maximum slip velocity V can be obtained while the grinding wheel arbor 12 is prevented from interfering with the workpiece W.

Accordingly, in the internal gear grinding method according to the present invention, the slip velocity is easily increased by setting the shaft angle $\Sigma$ large based on the amount of change in the grinding wheel pitch radius of the threaded grinding wheel 11. As a result, the cutting quality of the threaded grinding wheel 11 improves, whereby the improvement of machining accuracy and the extension of the tool life can be achieved. In addition, the increase of the slip velocity V improves performance in grinding and tooth surface modification, whereby a pitch error can be easily corrected.

It should be noted that, in this embodiment, the internal gear machining method according to the present invention is applied to the internal gear grinding method which performs grinding on a heat-treated workpiece W using the threaded grinding wheel 11. However, the internal gear machining method according to the present invention is also applicable to an internal gear finishing method which performs finishing on an unheat-treated workpiece W using a shaving cutter.

INDUSTRIAL APPLICABILITY

The present invention can be applied to an internal gear machining method which is capable of machining an internal gear in a high speed with a barrel-shaped threaded tool.

The invention claimed is:

1. An internal gear machining method which performs internal gear machining on a to-be-machined internal gear by synchronously rotating the to-be-machined internal gear and a barrel-shaped threaded tool in mesh with each other, the to-be-machined internal gear being rotatable about a workpiece rotation axis, the barrel-shaped threaded tool being rotatable about a tool rotation axis having a predetermined crossed axes angle to the workpiece rotation axis, wherein the crossed axes angle is set based on a threaded tool form, and wherein the threaded tool has such a form that an amount of change in a tool radius and the crossed axes angle satisfy a relationship that the crossed axes angle increases as the amount of change in the tool radius increases, where the amount of change in a tool radius is found from a tool diameter of an axially intermediate portion of the threaded tool and tool diameters of axially opposite end portions of the threaded tool.

2. The internal gear machining method according to claim 1, wherein the threaded tool is formed into a barrel shape having the tool diameter gradually decreasing from the axially intermediate portion of the threaded tool toward the axially opposite end portions of the threaded tool.

* * * * *